United States Patent [19]

Cadotte et al.

[11] Patent Number: 4,888,116
[45] Date of Patent: Dec. 19, 1989

[54] METHOD OF IMPROVING MEMBRANE PROPERTIES VIA REACTION OF DIAZONIUM COMPOUNDS OR PRECURSORS

[75] Inventors: John E. Cadotte, Minnetonka, Minn.; Donald L. Schmidt, Midland, Mich.

[73] Assignees: The Dow Chemical Company, Midland, Mich.; Filmtec Corp., Minneapolis, Minn.

[21] Appl. No.: 286,677

[22] Filed: Dec. 19, 1988

Related U.S. Application Data

[60] Division of Ser. No. 83,134, Aug. 10, 1987, Pat. No. 4,812,238, and a continuation-in-part of Ser. No. 3,996, Jan. 15, 1987, abandoned.

[51] Int. Cl.$^4$ .................. B01D 13/00; C02F 1/44
[52] U.S. Cl. .................. 210/636; 210/654; 210/655; 210/500.38
[58] Field of Search ............. 55/16, 158; 210/500.23, 210/500.3, 500.37, 500.38, 500.39, 636, 654, 655; 264/41, 48; 427/244–246, 341

[56] References Cited

U.S. PATENT DOCUMENTS

| | | | |
|---|---|---|---|
| 3,551,331 | 12/1970 | Cescon et al. | 210/500.38 X |
| 3,721,623 | 3/1973 | Stana | 210/500.3 X |
| 3,806,564 | 4/1974 | Riley et al. | 210/500.3 X |
| 3,850,797 | 11/1974 | Lyall | 210/655 X |
| 3,951,920 | 4/1976 | Senoo et al. | 210/500.38 X |
| 4,005,012 | 1/1977 | Wrasidlo | 210/500.38 X |
| 4,080,296 | 3/1978 | Clark | 210/323.1 |
| 4,087,388 | 5/1978 | Jensen et al. | 210/500.38 X |
| 4,259,183 | 3/1981 | Cadotte | 210/500.38 X |
| 4,277,344 | 7/1981 | Cadotte | 210/654 |
| 4,340,479 | 7/1982 | Pall | 264/41 X |
| 4,340,480 | 7/1982 | Pall et al. | 264/41 X |
| 4,415,455 | 11/1983 | Osei-Gyimah et al. | 210/654 |
| 4,472,175 | 9/1984 | Malon et al. | 55/16 |
| 4,512,893 | 4/1985 | Makino et al. | 55/158 X |
| 4,520,044 | 5/1985 | Sundet | 427/244 |
| 4,584,103 | 4/1986 | Linder et al. | 210/654 X |
| 4,601,827 | 7/1986 | Buckfelder et al. | 264/41 X |
| 4,605,526 | 8/1986 | Reynhout et al. | 264/41 |
| 4,606,943 | 8/1986 | Rak et al. | 427/244 |
| 4,626,468 | 12/1986 | Sundet | 210/654 |
| 4,627,992 | 12/1986 | Badenhop et al. | 264/41 X |
| 4,661,254 | 4/1987 | Zupancic et al. | 210/500.39 X |
| 4,673,504 | 6/1987 | Ostreicher et al. | 210/500.38 X |
| 4,701,186 | 10/1987 | Zampini | 55/16 X |
| 4,704,324 | 11/1987 | Davis et al. | 428/308.4 |
| 4,719,062 | 1/1988 | Sundet | 264/41 |
| 4,812,238 | 3/1989 | Cadotte et al. | 210/636 |

FOREIGN PATENT DOCUMENTS 49-045147 12/1974 Japan .................. 210/655
59-080304 5/1984 Japan .

OTHER PUBLICATIONS

Chemical Abstracts: 91:58115m; 93:27284c; 93:27283b; 99:124275g; 96:7408e; 92:182726w; 87:202397s; 91:153551j; 102:132956a; 86:51761g; 81:78952d; 77:102761f and 82:58953x.
The Condensed Chemical Dictionary, Tenth Edition, pp. 419, 476, Van Nostrand Reinhold Co. (1981).

Primary Examiner—Robert Spitzer

[57] ABSTRACT

A method of improving the properties of a reverse osmosis membrane having a polyamide discriminating layer containing residual aromatic primary amine groups is described. In this method, the polyamide discriminating layer of the membrane is treated with an aqueous solution of a reagent which reacts with primary amine groups to form diazonium salt groups or derivatives of diazonium salt groups. This method results in a membrane possessing improved chlorine resistance. When nitrous acid is employed as the reagent in the treatment, the water flux of the polyamide membrane is frequently increased with little or no effect on the salt rejection of the membrane.

11 Claims, No Drawings

METHOD OF IMPROVING MEMBRANE PROPERTIES VIA REACTION OF DIAZONIUM COMPOUNDS OR PRECURSORS

CROSS REFERENCE TO RELATED APPLICATIONS

This is a divisional of copending application Ser. No. 083,134, filed Aug. 10, 1987, now U.S. Pat. No. 4,812,238, which is a continuation-in-part of application Ser. No. 003,996, filed Jan. 15, 1987, now abandoned.

BACKGROUND OF THE INVENTION

This invention relates to reverse osmosis membranes.

Removal of materials dissolved or dispersed in a solution by separation of these materials from the dispersing medium or solvent utilizing reverse osmosis membranes is well known. The membranes used for reverse osmosis are selectively permeable to certain components of the mixture to be separated. Generally, water is the component to which such membranes are especially permeable. The aqueous feed solution is conveniently brought in contact with one surface of the reverse osmosis membrane under pressure so as to effect permeation of water through the membrane.

The performance of the reverse osmosis membrane has a critical effect on the efficiency and efficacy of reverse osmosis membrane processes. Advantageously, a reverse osmosis membrane should combine high rejection of solutes with a high water flux and should display resistance to deterioration by hydrolysis or oxidation.

Polyamide membranes have been widely employed in reverse osmosis processes. U.S. Pat. No. 4,277,344 describes a variety of membranes having a polyamide discriminating layer. Thin film composite membranes having a crosslinked polyamide discriminating layer have proven particularly useful in reverse osmosis processes. Such membranes are further illustrated in U.S. Pat. Nos. 4,520,044 and 4,606,943.

U.S. Pat. No. 3,551,331 describes a process for modifying the permeability of a substantially linear aliphatic polyamide membrane. In this process, the polyamide membrane is treated with a protonic acid, lyotropic salt or a Lewis acid.

U.S. patent application Ser. No. 790,287, filed Oct. 22, 1985, now U.S. Pat. No. 4,704,324 describes membranes prepared by reaction of a nucleophilic first compound with a second compound bearing reactive onium groups.

Although the commercial polyamide membranes can display an excellent combination of water flux, salt rejection and chemical stability, membranes having improved performance characteristics are still being actively sought. Further, processes for enhancing the flux of membranes which have become fouled during use are desired.

SUMMARY OF THE INVENTION

Novel membranes and processes for making the same have now been discovered. The novel membranes are derived from a structure having a porous support and a layer having a plurality of amine groups and groups reactive with diazonium salts. In one aspect, the discriminating layer of the membrane is prepared from reactants comprising (a) a compound or polymer bearing an average of at least two primary amine groups and (b) a compound or polymer bearing an average of at least two carboxylic acid halide groups or equivalents.

In one preferred embodiment, the discriminating layer is a polyamide which, prior to treatment hereunder, contains a plurality of residual primary aromatic amine groups or will be a polymer crosslinked with amide moieties derived from a polymer bearing amine groups. These amine groups can be either unreacted amine groups pendant from the polyamide or unreacted amine polymers or compounds included in the polyamide discriminating layer. In this preferred aspect, the residual primary aromatic amine groups contained in the polyamide or amine groups of the precursor polymer are reacted to form diazonium salts or derivatives of diazonium salts. Primary aromatic amine groups as described herein are amine groups in which the nitrogen bears two hydrogens and is bonded to an aromatic hydrocarbon moiety, such as a phenylene group or other aromatic nucleus.

In one preferred aspect, this invention is a method of improving the properties of a reverse osmosis membrane having a polyamide discriminating layer containing a plurality of residual aromatic primary amine groups. This method comprises treating the polyamide discriminating layer with an aqueous solution of reagent which will react with the primary amine groups present to form diazonium salt groups or derivatives of diazonium salts.

In another embodiment of the invention, a water-soluble composition containing amine groups and carboxylate groups can be rendered insoluble. The nitrous acid treatment crosslinks even normally water-soluble layers when a concentrated salt solution is employed. The resulting crosslinked layer can be selectively permeable and can be employed as the discriminating layer in a composite membrane.

In yet another aspect, the subject invention comprises a process for selectively separating water from an aqueous mixture or solution using a reverse osmosis membrane having a discriminating layer in which primary amine groups have been reacted to form diazonium groups or derivatives thereof.

The membranes of this invention in preferred embodiments are superior to the prior art polyamide membranes in one or more respects. Generally, a treated polyamide membrane will exhibit superior chemical stability. In particular, the membrane treated to convert the primary aromatic amine groups to diazonium salts or derivatives thereof shows superior chlorine stability relative to an untreated reverse osmosis membrane. It has also been found that preferred membranes so treated exhibit a higher flux with minimal loss of rejection relative to the membrane prior to treatment. Surprisingly, it has been found that even fouled aromatic polyamide membranes can be treated in accordance with the method of the subject invention to restore the flux and other desirable characteristics of the membrane.

DETAILED DESCRIPTION OF THE INVENTION

The treatment of the compositions including amine groups as described herein to react said amines with precursors of diazonium groups is a surprisingly versatile method of fabricating membranes. The permselectivity of the resulting discriminating layer can be varied by changing the nature of the compatible moieties present in the polymer. Gas separation membranes can be made by this method, but reverse osmosis membranes are the primary focus of the descriptions which follow.

Reverse osmosis membranes having polyamide discriminating layers are well known in the art. The polyamide layer herein is advantageously aromatic and desirably crosslinked. The polyamide can contain some aliphatic or cycloaliphatic groups, although this is generally not preferred. Illustrative of prior art polyamide membranes which can be improved in accordance with the method of this invention are those in U.S. Pat. No. 4,277,344, which is incorporated herein by reference. Other polyamide membranes which are operable in the subject method are described in U.S. Pat. No. 4,606,943 and U.S. Pat. No. 4,520,044, both of which are incorporated herein by reference.

In one embodiment of this invention, the layer bearing the amine groups may consist of a polymer bearing a plurality of aliphatic amine groups and groups reactive with a diazonium group. Illustrative groups reactive with the diazonium group include carboxylic acid, amide, mercaptide and sulfonamide groups. Such polymers can conveniently be prepared by conventional vinyl addition polymerization of an unsaturated monomer bearing a primary amine, such as aminoethyl methacrylate or a carboxylic acid such as methacrylic acid. The monomers can be selected to impart resistance to hydrolysis and sufficient chemical stability suitable for a reverse osmosis membrane or the selective permeability for different gases desired in a gas separation membrane. Compatible monomers are used to modify the properties of the resulting polymer in the manner suggested in the art pertaining to membranes. For example, monomers bearing hydrophobic groups may be desirable to impart better film-forming properties to the coating. Alternatively, hydroxyethyl methacrylate or other hydrophilic groups may increase water flux through the membrane.

The preparation of a vinyl addition polymer as described herein is well known in the art. The selection of initiators, chain terminators and the specific reaction conditions are within the skill in the art. Where reactivity ratios are not favorable, monomers can be metered in at the rate these are converted into polymers so as to control the polymer composition. These polymers may or may not be crosslinked.

The amine groups to be reacted with the precursor of the diazonium compound may be arylamine, substituted arylamine, alkylamine or substituted alkylamine groups pendant from the polymer backbone. Alternatively, the amine group may be present as an ammonium salt. For example, a polymer bearing a plurality of amine groups can be reacted with a difunctional or polyfunctional carboxylic acid to form ammonium carboxylate groups. In another embodiment of the invention, a polymer bearing a plurality of carboxylic acid groups may be neutralized with a difunctional or polyfunctional amine to form carboxylate ammonium groups. The reference to a "polymer including at least one primary amine group and at least one group reactive with a diazonium salt" as used herein encompasses the possibility that the polymer bears ammonium carboxylate salt or carboxylate ammonium salt groups. It is preferred, when the polymer is not crosslinked, that the polymer include an average of at least two of the amine groups and an average of at least two of the groups reactive with the diazonium salt. It is also preferred that, when the amine is present as an ammonium carboxylate or carboxylate ammonium, the counterion, i.e., the ion not bonded to the polymer, be difunctional or polyfunctional.

In a preferred embodiment of this invention, the reverse osmosis membrane starting material has a polyamide discriminating layer which can be prepared by reaction of (a) an aromatic polyamine compound bearing an average of at least two primary amine groups and (b) an aromatic polyfunctional acyl halide having an average of more than two acyl halide groups on an aromatic nucleus. More preferably, (b) is a trimesoyl halide or mixture thereof with isophthaloyl halide or terephthaloyl halide. Acyl halide, as used herein, refers to acyl bromide groups, or more preferably acyl chloride groups. Most preferably, (b) consists of at least 50 mole percent trimesoyl chloride. Cycloaliphatic acid chlorides are also operable reactants. For example, (b) can be cyclohexane-1,3,5-tricarbonyl chloride reactant.

The aromatic polyamine reactant is desirably phenylenediamine. Preferably, the polyamine reactant is meta-phenylenediamine. The membrane may also contain a minor amount of aliphatic or cycloaliphatic diamines or polyamine reactants, for example, piperazine.

In one embodiment of the invention, the aromatic polyamine reactant is a polymer. For example, a polymer made by reaction of a difunctional aromatic amine with trimellitic anhydride acid halide optionally mixed with a trimesoyl halide, as described in U.S. Pat. No. 4,606,943, is operable, but not preferred.

The polyamide forming the membrane discriminating layer preferably is crosslinked. These polyamides preferably have a crosslink density of at least about 10 crosslinks, more preferably at least about 50 per one hundred thousand molecular weight.

The reaction used to prepare the prior art polyamide membranes generally does not completely derivatize all of the aromatic primary amine groups present. Even where an excess of the acyl halide is employed, the polyamide discriminating layer is likely to contain residual aromatic amine groups and/or amines. It has now been discovered that these residual aromatic amine groups can have a deleterious effect on the permeability of the polyamide discriminating layer. In addition, the residual amine groups can adversely affect the chemical stability of the polyamide.

The sodium chloride rejection and water flux of the polyamide reverse osmosis membrane prior to treatment can operably vary over a wide range. For convenience in reporting flux and sodium chloride rejection, all of the values reported herein will be made with reference to standard test conditions using an aqueous 0.2 weight percent sodium chloride solution at 200 lbs./in$^2$ gauge (psig) at 25° C. unless otherwise indicated. Desirably, the reverse osmosis membrane after treatment will have a sodium chloride rejection of at least about 90 percent and a water flux of at least about 10 gallons per square foot per day (gfd) when tested at standard conditions. More preferably, the membrane after treatment will have a sodium chloride rejection of at least about 95 percent and a flux of at least about 15 gfd. It has been found by the method of this invention that new polyamide membranes having a water flux of 1 gfd and salt rejection of less than 60 percent at standard conditions can be restored to the desired flux and salt rejection in the preferred range stated hereinbefore. Membranes which have become fouled during operation and after air-drying exhibit essentially zero water flux have also been restored to water fluxes greater than 10 gfd and rejections greater than 95 percent by the method described herein.

Membranes having a layer bearing amine and diazonium reactive groups are available or can be made in a variety of configurations. Flat sheet, tubular and hollow fiber membranes are well known in the prior art. Membranes of any of these configurations can be used in accordance with the method of this invention.

Prior art membranes also vary in morphology. Homogeneous membranes are operable herein but asymmetric membranes are preferred with thin film composite membranes being more preferred for use in the invention herein. Thin film composite membranes can be prepared in accordance with conventional techniques described in the prior art. The polyamide discriminating layer or amine-containing layer can be conveniently formed on a suitable support layer by deposition from a solution or interfacial polymerization.

In one preferred embodiment of the invention, a water-soluble polymer bearing a plurality of amine and carboxylic acid groups is used to coat the lumen of a hollow fiber. The hollow fiber advantageously is microporous. The coating is conveniently introduced by pumping an aqueous solution of polymer down the fiber bore. The fiber should be substantially dry. Optionally, the polymer solution can be introduced in plugs separated by gas bubbles. The polymer solution is allowed to wet the fiber, the fiber cooled and nitrous acid solution introduced to crosslink the polymer. The resulting coated fiber is useful as a reverse osmosis membrane.

Suitable support layers for composite membranes have been extensively described in the prior art. Illustrative support materials include organic polymeric materials such as polysulfone, polyethersulfone, chlorinated polyvinyl chloride, styrene/acrylonitrile copolymer, polybutylene terephthalate, cellulose esters, and other polymers which can be prepared with a high degree of porosity and controlled pore size distribution. Porous inorganic materials may also be operable as supports. Preferably, the pores in the polymers will range in size from about 1 to 1,000 nanometers in their widest dimension at the surface in intimate contact with the discriminating layer. Especially preferred as support layers are porous polysulfone films. These films are generally cast on non-woven fabric or woven cloth, typically polyester or polypropylene.

The support layer provides mechanical strength to the thin film composite membranes. The support layer is advantageously as thin and porous as possible, while still imparting desired physical strength to the membrane. In an especially preferred embodiment of this invention, the polyamide discriminating layer is formed on the support layer via interfacial polymerization of monomeric reactants. To illustrate, the porous support layer can be coated or imbibed with an aqueous solution of a polyamine. Surface active agents can be present on the support layer or in the solution to augment film formation. Water-immiscible solvent containing a polyfunctional acyl halide can then be brought into contact with the support layer in conditions conducive to polymerization. This solvent is advantageously a $C_5$ to $C_8$ alkane, a chloroalkane, a fluoroalkane, or chlorofluoroalkane, which does not deleteriously affect the support layer. By this technique, a thin, essentially defect-free discriminating layer can be formed.

The discriminating layer is desirably as thin as possible while still remaining essentially defect-free. In general, the water flux through the discriminating layer is inversely proportional to the thickness of the layer. However, a thin layer is more prone to defects or discontinuities in the layer than a thicker layer.

In a preferred embodiment of this invention, the membrane is assembled in a device prior to the treatment described herein. The treatment of the membrane in a device obviates post-treatment handling operations which can create defects in the membrane discriminating layer. As an alternative, the membrane can be treated as described herein in a sheet or fiber form as it is produced or in a post-production step. The treated membrane can then be assembled in a device. Desirably, the membrane is not allowed to dry after treatment.

The membrane can be assembled in a variety of devices known in the prior art. For example, flat sheets can be utilized in either plate and frame or spiral devices. Tubular and hollow fiber membranes can be assembled in a generally parallel bundle with tube sheets at opposing ends of the hollow fiber membranes. Alternatively, hollow fiber membranes can be assembled in a U-shaped bundle with both ends secured in a single tube sheet. Hollow fiber devices can optionally be assembled about a central perforated core, having a central tube sheet or assembled in a bias wrap configuration as in U.S. Pat. No. 4,080,296. Spiral membrane devices are especially preferred.

In one method of this invention, the discriminating layer or precursor of such layer is contacted with the reactant so as to convert residual primary amine groups present to diazonium salts. The reagent used is preferably nitrous acid or a reagent which will form nitrous acid in situ, such as alkali metal nitrite in an acidic solution or nitrosyl sulfuric acid. Also, nitrous acid vapors may be used for treatment. Alternatively, sodium nitrite and sulfuric acid in an aqueous sodium sulfate solution can be used.

Because nitrous acid is volatile and subject to decomposition, it is preferred to form it by reaction of an alkali metal nitrite in an acidic solution in contact with the polyamide discriminating layer. Generally, if the pH of the aqueous solution is less than about 7, preferably less than about 5, an alkali metal nitrite will react to liberate nitrous acid. Sodium nitrite reacted with hydrochloric or sulfuric acid in an aqueous solution is especially preferred for formation of nitrous acid.

The nitrous acid must be brought into contact with the discriminating layer in a manner which will permit diffusion of the nitrous acid to the reactive amine groups in the discriminating layer. It has been found to be advantageous to employ a wetting agent to facilitate diffusion of the nitrous acid into hydrophobic membranes, if the membrane is not already wet. The wetting agent may swell the discriminating layer, causing an increase in flux. This wetting agent can be employed in the aqueous solution containing the nitrous acid, its precursor or as a pre-treatment prior to contacting the membrane with the nitrous acid or equivalent. Suitable as wetting agents are surfactants or organic compounds which render the membrane surface less hydrophobic without deleteriously affecting the membrane and its characteristics. Illustrative of operable wetting agents are $C_1$ to $C_3$ alkanols and $C_3$ to $C_5$ ketones. Surfactants may be operable for wetting, but are generally not preferred. A preferred wetting agent is isopropyl alcohol. Conveniently, the aqueous solution containing the nitrous acid or its precursor will contain from about 5 to about 50 volume percent, preferably about 10 to about 20 volume percent of isopropyl alcohol or an equivalent wetting agent.

In one preferred method of this invention, it is believed that nitrous acid reacts with the primary amine groups present to form a diazonium salt group. This salt can in turn react with labile hydrogens of the carboxylic acid groups or amides present. The possible reactions of the diazonium salt group are complex in this system and have not been fully investigated. It is believed generally desirable that the nitrous acid or other reagent be present in a concentration which will react with a plurality of the primary amine groups, but will permit reaction of some of the resulting diazonium groups with other moieties present. One probable reaction of the diazonium group is ring coupling to form azo compounds.

Desirably, the concentration of the nitrous acid in the aqueous medium contacting the membrane should be in the range from about 0.01 to about 1 percent by weight at 20° C. Generally, the nitrous acid is more soluble at 5° C. than at 20° C. and somewhat higher concentrations of nitrous acid are operable at lower temperatures. Higher concentrations of nitrous acid are operable so long as the membrane is not deleteriously affected and the solutions can be handled safely. In general, concentrations of nitrous acid higher than about one-half (0.5) percent are not preferred because of difficulties in handling these solutions. Preferably, the nitrous acid is present at a concentration of about 0.1 weight percent or less because of its limited solubility at atmospheric pressure. Pressures above atmospheric pressure can be used to increase solubility, but are not generally convenient. Lower concentrations of diazonium salts than those in the preferred range may be operable, but can substantially increase reaction time.

Where the layer to be reacted is water-soluble, a large excess of nitrite may be employed in the nitrous acid solution. The polymer layer is less soluble in the concentrated salt solution than in water. The treatment with nitrous acid crosslinks the polymer to render it insoluble in water.

In general, it is desirable that the nitrous acid present in the dilute aqueous treating solution pass over the surface of the membrane in a continuous stream. This allows the use of relatively low concentrations of nitrous acid. When the nitrous acid is depleted from the treating medium, it can be replenished and the medium recycled to the membrane surface for additional treatment. Batch treatments are also operable.

It is possible to use low concentrations (less than about 0.1 weight percent) of nitrous acid where the aqueous treating medium is allowed to pass continuously over the membrane surface to be treated so that nitrous acid concentration is maintained essentially continuously. Where contact between the membrane and the treating solution occurs batch-wise, generally, it is desirable to use relatively larger concentrations of nitrous acid.

The reaction between the nitrous acid and the primary amine groups occurs relatively quickly once the nitrous acid has diffused into the membrane. The time required for diffusion and the desired reaction to occur will depend upon the concentration of nitrous acid, the pre-wetting of the membrane, the concentration of primary amine groups present and the temperature at which contact occurs. Contact times in the range from about 1 hour to about 72 hours have been found to be convenient. Shorter contact times may be operable if a transmembrane pressure differential is used to promote diffusion into the membrane. The optimum reaction time can be readily determined empirically for a particular membrane and treatment. Generally, where coupling reactions occur between the diazonium salts formed and residual monomeric amine groups present, the membrane will be discolored by the reaction. Where the membrane is visible, the appearance of a light brown or tan color on the normally white to off-white membrane surface signals that the reaction has proceeded to a significant degree.

The temperature at which the membrane is contacted can vary over a wide range. Inasmuch as the nitrous acid is not particularly stable, it is generally desirable to use contact temperatures in the range from about 0° to about 30° C., with temperatures in the range from 0° to about 20° C. being preferred. Temperatures higher than this range can increase the need for ventilation or superatmospheric pressure above the treating solution. Temperatures below the preferred range generally result in reduced reaction and diffusion rates.

In the event that the membrane to be treated already has a water flux near the maximum attainable for said membrane, the treatment of membranes with nitrous acid in accordance with the method of this invention does not dramatically increase the water flux. Treatment in accordance with the method of this invention will still impart improved chemical stability to such membranes. In particular, it has been found that treatment with nitrous acid will increase the chlorine resistance and resistance to chemical oxidants of the subject membranes.

In another embodiment of the subject invention, a diazonium salt can be formed external to the membrane and used as the treating reagent. Such diazonium salts can be obtained in accordance with methods described in the prior art or are available commercially. For example, meta-phenylenediamine can be pre-reacted with nitrous acid to form a diazonium salt of the diamine. Diazonium compounds used in the prior art as dyes are also operable in this method. These externally formed diazonium salts will react with aromatic primary amine groups present in the polyamide discriminating layer in the same general manner as the diazonium groups formed in situ in the polyamide by reaction with nitrous acid. The treatment of the polyamide discriminating layer with an externally prepared diazonium salt will increase the chemical stability of the membrane. However, the treatment with the pre-formed diazonium compound generally results in a decrease in the flux of the membrane and therefore is not as desirable as the reaction with the nitrous acid.

The conditions at which the pre-formed diazonium salt is contacted with the membrane are generally similar to those used for the nitrous acid reaction. Temperatures in the range of about 0° to about 30° C. are preferred for the contact. Concentrations of the diazonium salt in the range from about 0.01 percent to about 1 percent by weight are preferred.

Because of the slower rate of diffusion of the diazonium salt into the membrane relative to nitrous acid, generally longer reaction times are required even when a wetting agent is employed. Reaction times from several hours to days are typical. Extended reaction times can adversely affect the flux through the membrane.

Membranes prepared as described herein can be post-treated, if desired, with protective or rejection enhancing coatings. However, such post-treatments are generally not required.

The following examples are presented to illustrate but not otherwise limit the subject invention. All parts are by weight unless otherwise indicated. The reverse osmosis tests in Examples 1-21 and Comparative Experiments A-K were made with 0.2 percent NaCl in water at 200 psi and 25° C. The reverse osmosis tests in Examples 22-35 were made with a feed solution of 3.2 percent NaCl in water at 800 psi and 25° C.

EXAMPLE 1 and COMPARATIVE EXPERIMENT A

A 3-inch by 12-inch sample of a thin film composite membrane bearing a poly(meta-phenylenediamine trimesamide) discriminating layer on a porous polysulfone support (available from FilmTec Corporation as FT-30 Membrane) was tested to determine its sodium chloride rejection and water flux at standard conditions. The water flux of the membrane was 3 gfd and salt rejection was 98.3 percent.

Two samples of untested membrane cut from the same sheet were treated with an aqueous solution of 90 parts water to 10 parts isopropanol by volume containing one part per thousand sodium nitrite and two parts per thousand of concentrated (37 percent) hydrochloric acid at ambient temperatures. The concentration of nitrous acid for purposes herein can be determined assuming that any alkali metal nitrite present will be converted into the nitrous acid. After 18 hours, the membrane appeared tan/brown in color and was removed from the aqueous nitrous acid solution. The membrane was rinsed with water and its flux and salt rejection tested. The flux of the first sample was 27 gfd with a rejection of 98.3 percent. The second sample had a flux of 36 gfd and a salt rejection of 95.5 percent.

In Comparative Experiment A, two samples of the same membrane were immersed in an aqueous solution of 90 parts water and 10 parts isopropanol by volume for periods of 10 minutes or 18 hours. After 10 minutes, the two samples so immersed both had water fluxes of 12 gfd with rejection of 96.1 percent and 98.4 percent, respectively. The two samples immersed for 18 hours displayed a flux of 10 gfd with a rejection of 97 percent and a flux of 13 gfd with a rejection of 98 percent.

It is apparent from these experiments that the wetting agent alone can significantly increase the flux of membrane. The effect of the wetting agent is not necessarily permanent, but will subside to a steady state value (which may exceed the flux prior to wetting) over a period of time as the membrane is used. Surprisingly, it has been found that the nitrous acid treatment produces a much greater increase in flux and also has a more sustained effect on the flux of the membrane.

EXAMPLE 2 AND COMPARATIVE EXPERIMENTS B AND C

A membrane similar in composition to that used in Example 1 was operated for one year at a commercial reverse osmosis membrane facility. The membrane was then air-dried but not cleaned. No water flux was observed through the membrane at standard test conditions.

Two samples of membrane were then treated with an aqueous solution of 90 parts water to 10 parts isopropanol with one part per thousand sodium nitrite and two parts per thousand concentrated hydrochloric acid in the manner of Example 1. After 18 hours, both samples of the membrane displayed water fluxes of 17 gfd and salt rejections of 97.3 percent.

In Comparative Experiment B, a sample of the dry membrane was immersed in an aqueous solution of 10 parts isopropanol to 90 parts water for 18 hours. A first sample of the membrane displayed a water flux of 10 gfd and rejection of 97.5 percent. A second sample of the same membrane exhibited a water flux of 14 gfd and a rejection of 96.8 percent.

In Comparative Experiment C, two air-dried samples of the same membrane were immersed in an aqueous solution of 90 parts water to 10 parts isopropanol containing one weight percent of concentrated hydrochloric acid. After 18 hours, the membranes were determined to have a water flux of 13 gfd and a rejection of 98.4 and 98.5 percent, respectively.

EXAMPLES 3-5 AND COMPARATIVE EXPERIMENT D

Samples were taken from a spiral membrane device sold by FilmTec Corporation under the designation FT-30 membrane. The flux and salt rejection of the samples were determined to be 6 gfd with 96.5 percent salt rejection for a first sample and 7 gfd with 97.3 percent salt rejection for a second sample.

Two samples of the membrane (Example 3) were immersed in an aqueous solution of 90 parts water to 10 parts isopropanol by volume containing one part per thousand sodium nitrite and two parts per thousand concentrated sulfuric acid. After one hour, the samples were removed, rinsed with water and the membrane characteristics determined. The first sample was found to have a water flux of 19 gfd and salt rejection of 95.6 percent. The second sample was determined to have a water flux of 24 gfd and salt rejection of 93.3 percent.

In a similar manner to Example 3, two samples of the same membrane (Example 4) were immersed in an aqueous isopropanol solution of sodium nitrite and sulfuric acid for about 20 hours. The first sample, after immersion, had a water flux of 20 gfd and a salt rejection of 94.1 percent, the second sample had a salt rejection of 96.5 percent and a water flux of 28 gfd.

Two more samples of the same membrane (Example 5) were immersed in an aqueous solution of 90 parts water to 10 parts isopropanol containing 1 part per thousand sodium nitrite and 20 parts per thousand of concentrated sulfuric acid. After 18 hours, the first sample was found to have a water flux of 18 gfd and a salt rejection of 95.3 percent. The second sample was determined to have a water flux of 32 gfd and a salt rejection of 95.2 percent.

In Comparative Experiment D, two more samples of the same membrane were immersed in an aqueous solution of 90 parts water and 10 parts isopropanol containing one part per thousand of sodium nitrite and no acid. After 18 hours, the first sample was determined to have a water flux of 10 gfd and a salt rejection of 93.9 percent. The second sample was determined to have a water flux of 13 gfd and a salt rejection of 94 percent.

From these experiments it is apparent that the treatment with nitrous acid significantly enhances the flux of the subject membrane without significantly diminishing the rejection of said membrane. Treatment with a wetting agent and sodium nitrite alone modestly enhanced the permeability of the membrane.

EXAMPLES 6-19 AND COMPARATIVE EXPERIMENTS E-H

In a series of experiments, samples of membranes similar in composition to that in Example 1 were treated with an aqueous solution of 90 parts water to 10 parts isopropanol by volume. The initial properties of each of the membranes in terms of flux and salt rejection are tabulated in Table I. The parts by weight of sodium nitrite and parts and identity of any acid present are also tabulated. Finally, the period during which the membrane is contacted by the aqueous solution and the final properties of the treated membrane are noted in Table I.

After immersion, the water flux of the first sample (Comparative Example I) was 10 gfd with a salt rejection of 93.9 percent. The water flux of the second sample (Comparative Example J) was 13 gfd at a salt rejection of 94 percent. These samples were subjected to an accelerated chlorine resistance test. After 24 hours, the first sample had a water flux of 84 gfd and salt rejection of 13 percent. The second sample had a water flux of 118 gfd and a salt rejection of 24 percent.

TABLE I

| Example | Comparative Experiment | Initial | | Treatment | | Time (Hours) | Final | |
|---|---|---|---|---|---|---|---|---|
| | | Flux (gfd) | Percent Salt Rejection | Acid (Parts) | NaNO$_2$ | | Flux (gfd) | Percent Salt Rejection |
| 6 | — | 12.7 | 98.1 | H$_2$SO$_4$ (2) | 1 part | 1 | 28.2 | 97.8 |
| 7 | — | 17.6 | 93.2 | H$_2$SO$_4$ (2) | 1 part | 1 | 23.6 | 98.1 |
| 8 | — | 22.0 | 91.0 | H$_2$SO$_4$ (2) | 1 part | 1 | 18.0 | 97.7 |
| 9 | — | 17.0 | 97.0 | H$_2$SO$_4$ (2) | 1 part | 1 | 22.6 | 98.0 |
| 10 | — | 1.4 | 85.0 | H$_2$SO$_4$ (2) | 1 part | 1 | 16.0 | 91.0 |
| 11 | — | 1.0 | 76.0 | H$_2$SO$_4$ (2) | 1 part | 1 | 21.0 | 96.0 |
| 12 | — | 6.0 | 96.5 | 37% HCl (2) | 1 part | 1 | 24.0 | 98.2 |
| 13 | — | 6.0 | 96.5 | 37% HCl (4) | 12 parts | 1 | 30.0 | 97.9 |
| 14 | — | 6.0 | 96.5 | 37% HCl (2) | 1 part | 72 | 30.0 | 97.9 |
| | E | 6.0 | 96.5 | None | 1 part | 1 | 9.8 | 97.8 |
| 15 | — | 7.0 | 97.3 | 37% HCl (2) | 1 part | 1 | 25.0 | 98.8 |
| 16 | — | 7.0 | 97.3 | 37% HCl (4) | 12 parts | 1 | 33.6 | 98.0 |
| 17 | — | 7.0 | 97.3 | 37% HCl (2) | 1 part | 72 | 32.3 | 98.7 |
| | F | 7.0 | 97.3 | None | 1 part | 1 | 10.0 | 98.9 |
| 18 | — | 4.2 | 86.3 | 37% HCl (2) | 1 Part | 18 | 12.1 | 97.8 |
| | G | 4.2 | 86.3 | None | None | 18 | 10.0 | 97.8 |
| 19 | — | 5.2 | 93.1 | 37% HCl (2) | 1 part | 18 | 15.4 | 97.6 |
| | H | 5.2 | 93.1 | None | None | 18 | 11.0 | 98.0 |

The data tabulated in Table I confirm that treatment with nitrous acid significantly improves the permeability of the polyamide membranes tested in virtually all of the examples. In Example 8, the flux suffered a modest decline but the salt rejection was enhanced significantly by said treatment. In the comparative experiments, where no nitrous acid was present, the increased flux is primarily attributable to the effect of the wetting agent and is transitory. It is noted that the wetting agent alone produces a much more modest increase in flux.

EXAMPLES 20 AND 21 AND COMPARATIVE EXPERIMENTS I AND J

A membrane similar to that used in Example 1 was treated in the manner of the membrane in Example 6. Samples of the membrane after this treatment exhibited a water flux of 19 gfd with a rejection of 95.6 percent and a water flux of 24 gfd with a rejection of 93.3 percent. The membrane was then subjected to an accelerated chlorine resistance test. In this test, the membrane was immersed in an aqueous solution containing one thousand parts per million of sodium hypochlorite for a period of 24 hours. At the end of that time, the water flux and salt rejection of the membrane were measured once more. The water flux of the first sample (Example 20) was 61 gfd at an 83 percent salt rejection. The second sample (Example 21) had a flux of 68 gfd at a salt rejection of 89 percent.

In comparative experiments, a similar membrane was immersed in an aqueous solution of 90 parts water to 10 parts isopropanol by volume for a period of one hour.

It can be seen from Examples 20 and 21 and Comparative Experiments I and J that the nitrous acid treated membrane is much more resistant to chlorine than the wettable but untreated membrane. The untreated membrane at the end of the subject tests exhibited very low salt rejection which suggests that nearly all of the transport of water through the membrane was through defects in the membrane.

EXAMPLES 22-24

Three spiral membrane devices were placed upright in an open vessel. The spiral membranes were 40 inches long and 8 inches in diameter and were made from a thin film composite membrane like the membrane tested in Example 1. The open vessel was equipped with inlets and outlets and a pump so that it can be alternately filled with liquid and emptied.

In a separate open vessel ("holding tank"), an aqueous mixture containing 20 percent by volume isopropyl alcohol was prepared. To this aqueous mixture was added 0.1 percent by weight sodium nitrite followed by 0.2 percent by weight concentrated sulfuric acid. The pH of the resulting solution was about 1.8. The aqueous solution was then pumped into the vessel containing the spiral membrane elements so as to immerse the elements in the liquid, thereby slowly filling the feed water channel with the aqueous mixture. After about 1 minute, the aqueous mixture was pumped out of the vessel containing the spiral membrane elements into the holding tank. After the aqueous mixture had drained from the elements, the mixture was once more pumped into the open vessel containing the elements. Periodically, the aqueous mixture was analyzed for nitrous acid using conventional colorimetric methods for determination of nitrous acid concentration. As necessary, the nitrous acid concentration was restored to 0.1 percent by addition of sodium nitrite and addition of sulfuric acid to reduce the solution pH to about 2. Once a concentration of greater than 0.05 percent nitrous acid was maintained over a 12-hour period without further addition of nitrous acid, the cycling of treating solution was discontinued. The open vessel containing the membrane elements was then filled with deionized water. The water wash was cycled between the open vessel containing the elements and the holding tank for 1 hour and the solution was then drained from the system. This rinse with water was repeated once more.

The water flux and salt rejection of the membrane elements was measured before and after treatment with the nitrous acid solution. The flux and rejection were measured using an aqueous solution containing 3.2 weight percent sodium chloride at 800 psi and 25° C. The water flux and rejection before and after treatment are tabulated in Table II. The water flux is reported in gallons per square foot per day and the sodium chloride rejection is reported in parts per million sodium chloride by weight in the product water.

TABLE II

| Example | Flux (Gallons per day) | | Rejection (ppm NaCl) | |
|---------|---------|---------|---------|---------|
| | Pre-treatment | Post-treatment | Pre-treatment | Post-treatment |
| 22 | 3,500 | 6,200 | 235 | 195 |
| 23 | 3,500 | 5,600 | 225 | 260 |
| 24 | 3,400 | 6,400 | 380 | 355 |

It is apparent from the data in Table II, that the nitrous acid treatment significantly increases the water flux of the membrane. It is noteworthy that this treatment has little effect on the salt passage through the membrane. In fact, in Examples 22 and 24, the salt passage through the membrane is actually reduced by the nitrous acid treatment.

EXAMPLES 25–31

In a manner generally similar to Example 22, several spiral membrane devices were alternately immersed in an aqueous nitrous acid solution and then drained. These membrane devices were 1.8 inches in diameter and 12 inches long. The composite membrane was similar in structure and composition to that in Example 1.

The aqueous nitrous acid solution was prepared from 4 gallons of water, 1 gallon of isopropyl alcohol, 0.1 weight percent of sodium nitrite and 0.2 weight percent of concentrated sulfuric acid. The pH of the resulting aqueous solution was about 1.8. The nitrous acid solution was cycled in and out of the feed water channel of the spiral membrane devices at about 5-minute intervals.

Periodically, the water was analyzed by a conventional method to determine nitrous acid concentration. When the nitrous acid concentration dropped below 0.05 percent, sodium nitrite and sulfuric acid was added to restore the nitrous acid concentration and reduce the pH of the solution to about 2. When a nitrous acid concentration of greater than 0.05 percent was maintained overnight, the treatment was discontinued. The vessel containing the membrane was filled with softened tap water and cycled for an additional hour and then drained. This rinse with water was repeated once more. The flux of the subject membranes was determined both before and after treatment with nitrous acid. The feed water solution used during testing contained 3.2 weight percent sodium chloride at a pressure of 800 psi and 25° C. The water flux for these examples is tabulated in Table III.

TABLE III

| | Flux (gfd) | |
|---------|---------|---------|
| Example | Pre-treatment | Post-Treatment |
| 25 | 12.4 | 22.4 |
| 26 | 12.1 | 20.8 |
| 27 | 12.7 | 22.6 |
| 28 | 10.9 | 19.9 |
| 29 | 10.4 | 21.6 |
| 30 | 10.7 | 18.4 |
| 31 | 10.9 | 19.7 |

The data tabulated in Table III indicate an increase in flux after treatment with nitrous acid averaging more than 80 percent.

EXAMPLES 32–39

Eight vinyl addition polymers were prepared from the following monomers: 2-hydroxyethyl methacrylate (HEMA), 2-aminoethyl methacrylate in HCl salt form (AEM), methacrylic acid (MAA), butyl methacrylate (BMA), methyl methacrylate (MMA) and

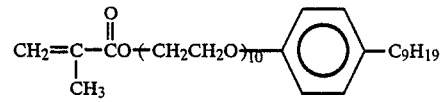

(9N10MA). The composition of the eight polymers in weight percent of the monomers is tabulated in Table IV in weight percent.

In general, the monomers were combined in a mixed solution of water and butyl alcohol, the solution purged with nitrogen and warmed to 50° C. To the mixture was added 0.1 gram (g) t-butyl hydroperoxide and 0.075 g Formopon, both in water over a period of one hour. The solution was then concentrated by heating under vacuum and then optionally dialyzed to remove low molecular weight fractions.

The polymers were diluted to a 3 weight percent aqueous solution containing 0.0075 weight percent on a solids basis of a fluorinated anionic surfactant (available from Minnesota Mining and Manufacturing Company as FLUORAD FC-129). One side of a microporous mixed cellulose ester filter (available from Millipore as filter type VSWP-04700) was washed with the solution. The coated filter was dried at 80° C. for 10 minutes. The filter was then immersed in a fresh aqueous solution of 5N NaNO$_2$ and 0.5N HCl at 0° C. for 15 minutes. A second layer of the addition polymer was applied, cured and treated.

The membrane was tested for water flux and salt rejection using an aqueous solution of 2,500 ppm NaCl and a pressure of 400 psi. The results are tabulated in Table IV.

TABLE IV

| Example | Polymer Composition | | | | | | Rejection (%) | Flux (gfd) |
|---|---|---|---|---|---|---|---|---|
| | HEMA | AEM | MAA | 9N10MA | BMA | MMA | | |
| 32 | 22 | 50 | 20 | 8 | — | — | 86.3 | 1.3 |
| 33 | 12 | 60 | 20 | 8 | — | — | 89.3 | 1.1 |
| 34 | — | 70 | 22 | 8 | | — | 87.7 | 0.8 |
| 35 | — | 76 | 24 | — | — | — | 92.8 | 1.1 |
| 36 | — | 67 | 33 | — | — | — | 92.2 | 1.3 |
| 37 | — | 66.6 | 11.1 | — | 11.1 | 11.2 | 85.5 | 1.7 |
| 38 | — | 60 | 20 | — | 20 | — | 79.3 | 3.2 |
| 39 | 34 | 40 | 18 | 8 | — | — | 83.0 | 1.6 |

The data tabulated in Table IV confirm that reverse osmosis membranes can be prepared by the subject method.

EXAMPLE 40

Ten g of a 10 weight percent solution of the ammonium salt of a terpolymer containing 80 weight percent 2-hydroxyethyl methacrylate (HEMA), 10 weight percent methacrylic acid (MAA), 10 weight percent 9N10MA was mixed with 0.5 g of ethylenediamine. The solution was dialyzed using a dialysis membrane having a 12,000 to 14,000 molecular weight cut-off. A solution containing 0.5 weight percent polymer and 0.0015 percent of a commercial fluorocarbon surfactant (Fluorad FC 129, available from Minnesota Mining and Manufacturing Company) was wiped onto a microporous filter like the one used in Example 32 and dried at 80° C. for 10 minutes. The coated filter was then immersed for 10 minutes in a 0° C. solution of a 1:1 (by volume) aqueous solution of 0.5N HCl and 5.0N NaNO$_2$. The coated filter was soaked in ice water for two hours, dried and the process repeated three more times. The resulting composite membrane had a sodium chloride rejection of 68 percent and a flux of 2.17 gfd when tested with an aqueous solution of 2500 ppm NaCl at 400 psi.

EXAMPLE 41

Ten g of a 10 weight percent solution of the ammonium salt of the terpolymer HEMA/MAA/9N10MA (at a 70:20:10 weight ratio) was mixed with 1 g of m-phenylenediamine. The solution was dialyzed using a dialysis membrane having a 12,000 to 14,000 molecular weight cut-off. A 3 percent solution containing 0.006 percent of a fluorocarbon surfactant was wiped onto a filter like the one used in Example 32 and dried at 80° C. for 10 minutes. The coated filter was then immersed at 0° C. in a 1:1 solution by volume of 0.5N HCl and 5N NaNO$_2$.

After 15 minutes, the filters were immersed in 0° C. water for 3 hours and tested for rejection at 400 psi with aqueous 2,500 ppm NaCl. A first sample had a rejection of 65 percent and a flux of 4.1 gfd and a second sample exhibited a rejection of 65 percent and a flux of 6.9 gfd.

What is claimed is:

1. A method of improving the properties of a reverse osmosis membrane having a polyamide discriminating layer containing a plurality of residual aromatic primary amine groups, comprising treating the polyamide discriminating layer with an aqueous solution of a reagent which reacts with primary amine groups to form diazonium salt groups or derivatives of diazonium salt groups.

2. The method as described in claim 1 further comprising treating the membrane with a wetting agent prior to treatment with the reagent.

3. The method as described in claim 1 wherein the aqueous solution includes a wetting agent.

4. The method as described in claim 1 wherein the polyamide is derived from an aromatic or cycloaliphatic compound bearing at least two acyl halide groups and a phenylenediamine.

5. The method as described in claim 4 wherein the compound bearing at least two acyl halide groups is trimesoyl halide, isophthaloyl halide, terephthaloyl halide or mixtures thereof.

6. The method as described in claim 5 wherein the acyl halide compound consists of at least 50 mole percent trimesoyl chloride.

7. The method as described in claim 6 wherein the acyl halide compound is cyclohexane-1,3,5-tricarbonyl chloride.

8. The method as described in claim 1 wherein the polyamide discriminating layer is treated with nitrous acid or a precursor which forms nitrous acid during treatment of the membrane.

9. The method as described in claim 8 wherein the polyamide is treated with nitrous acid at a temperature in the range from about 0° to about 30° C.

10. The method as described in claim 9 wherein the aqueous solution contains from about 0.01 to about 1 percent nitrous acid by weight.

11. The method as described in claim 1 wherein the reagent is nitrous acid or a precursor which forms nitrous acid during treatment of the membrane and the water flux of the treated membrane at a pressure of 200 psi and a temperature of 25° C. using a 0.2 weight percent aqueous NaCl solution is at least 10 percent greater than the water flux of the same membrane at these conditions prior to treatment.

* * * * *